Figure 1:
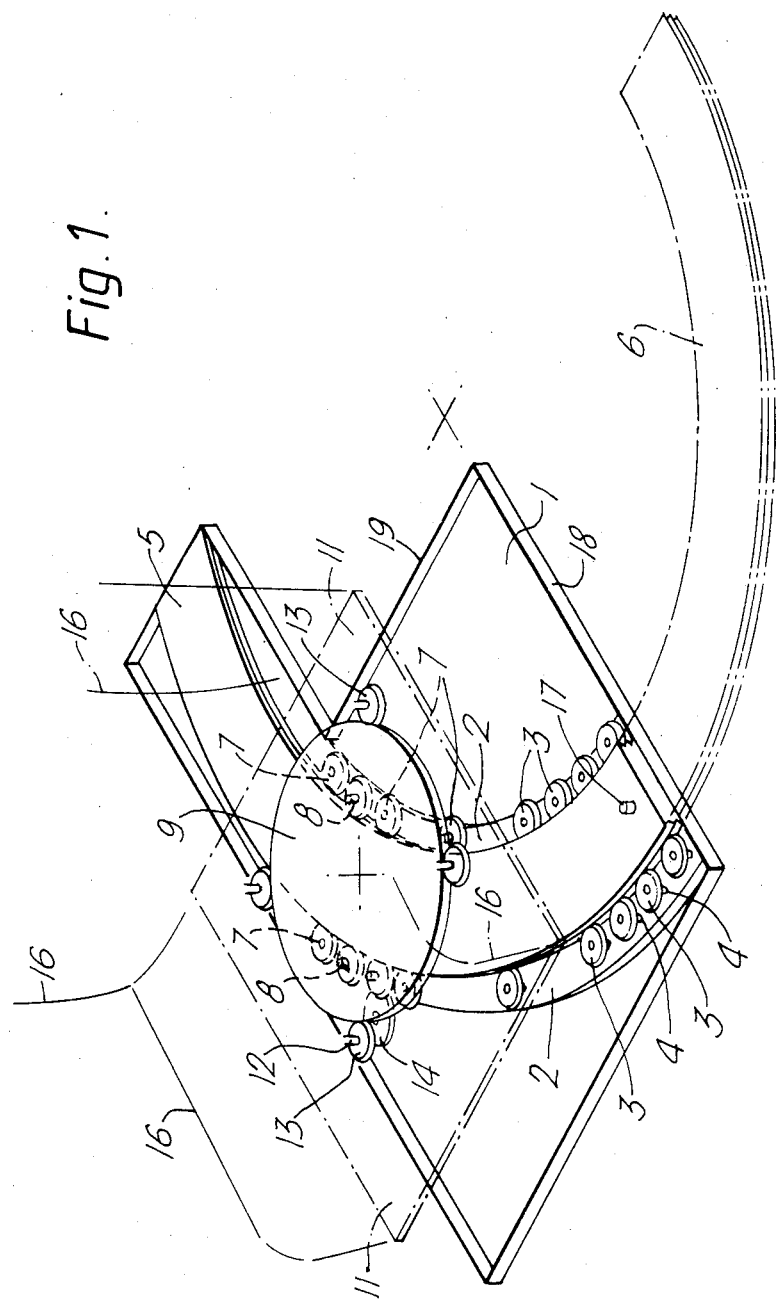

United States Patent [19]
Goodall et al.

[11] Patent Number: 4,815,785
[45] Date of Patent: Mar. 28, 1989

[54] MOVABLE SEAT ARRANGEMENT

[76] Inventors: Melvyn J. Goodall, Little Seaside, Branscombe, Seaton, Devon EX12 3DP; Colin N. Kemp, Flat 1, Herons Court, Felpham, Bognor Regis, Sussex, both of United Kingdom

[21] Appl. No.: 63,134
[22] PCT Filed: Sep. 18, 1986
[86] PCT No.: PCT/GB86/00556
    § 371 Date: May 18, 1987
    § 102(e) Date: May 18, 1987
[87] PCT Pub. No.: WO87/01661
    PCT Pub. Date: Mar. 26, 1987

[30] Foreign Application Priority Data
    Sep. 18, 1985 [GB] United Kingdom ............ 8523056

[51] Int. Cl.⁴ ............................ B60N 1/04; B60N 1/08
[52] U.S. Cl. ................................ 296/65.1; 297/241;
                           297/349; 248/299; 248/430; 414/921
[58] Field of Search ............. 296/65 R, 69; 297/241,
                           297/349; 248/429, 430, 299; 414/921

[56]                References Cited
             U.S. PATENT DOCUMENTS

| 1,903,267 | 3/1933 | Roberts | 297/349 |
| 2,290,464 | 7/1942 | Buchheit | 297/349 X |
| 2,587,679 | 3/1952 | Atkinson | 296/65 R |
| 2,822,858 | 2/1958 | Mussler | 297/349 |
| 2,937,839 | 5/1960 | Randolph | 248/299 |
| 3,051,522 | 8/1962 | Myers | 297/349 X |
| 3,066,979 | 12/1962 | Pitts et al. | 297/349 |
| 3,785,700 | 1/1974 | Kubo | 297/349 |
| 3,860,283 | 1/1975 | Colautti | 297/349 X |
| 4,029,223 | 6/1977 | Adamski et al. | 280/166 X |
| 4,155,587 | 5/1979 | Mitchell | 414/921 |
| 4,600,239 | 7/1986 | Gerstein et al. | 296/65 R |

FOREIGN PATENT DOCUMENTS

| 0081944 | 6/1983 | European Pat. Off. . | |
| 095533 | 7/1983 | European Pat. Off. . | |
| 2480206 | 10/1981 | France | 414/921 |
| 101832 | 6/1983 | Japan . | |
| 00192 | 11/1985 | PCT Int'l Appl. . | |
| 330396 | 6/1930 | United Kingdom | 296/65 R |
| 2071585 | 9/1981 | United Kingdom . | |
| 2069969 | 9/1981 | United Kingdom . | |

Primary Examiner—Dennis H. Pedder
Attorney, Agent, or Firm—Nutter, McClennen & Fish

[57] ABSTRACT

A movable seat arrangement for a vehicle includes a base plate having guides which define a curved path for a beam and which support the beam so that it can travel along the curved path, the beam in its turn supporting a seat in such a way that the seat can travel along the beam, whereby the seat can travel along the beam until a position near to the edge of the vehicle is reached and the beam may then be extended along the curved path to carry a passenger in the seat clear of the vehicle.

5 Claims, 5 Drawing Sheets

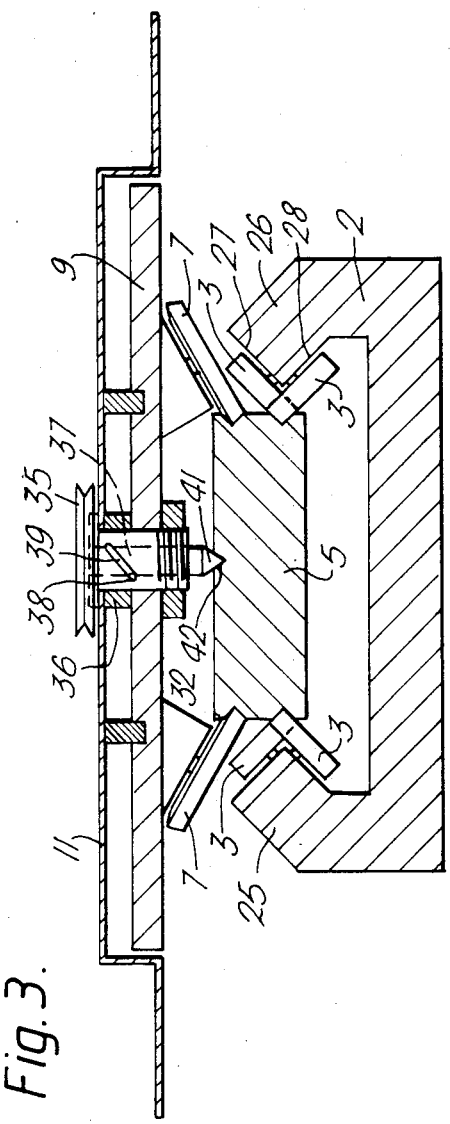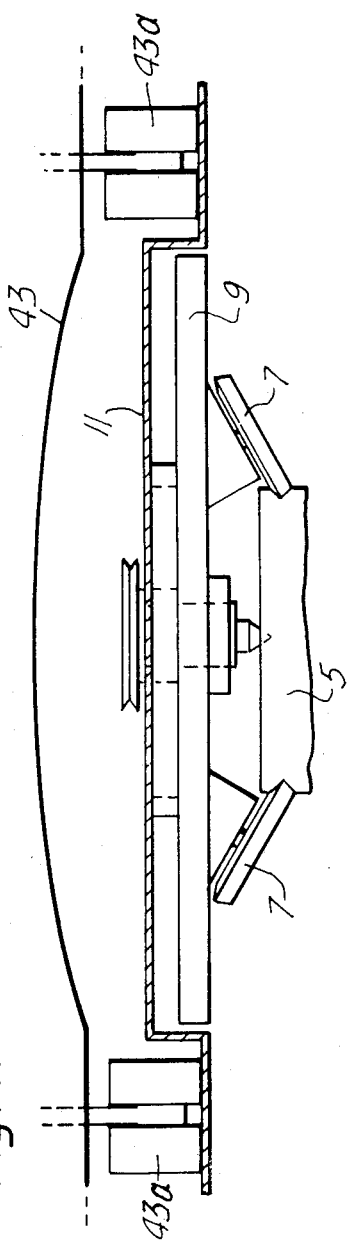

MOVABLE SEAT ARRANGEMENT

This invention relates to a movable seat arrangement which is particularly suitable for the disabled. Entry into and exit from vehicles by disabled or handicapped persons pose extreme difficulties. To enable handicapped persons to enter or to leave a vehicle, systems have been proposed in which a seat is moved substantially forwards, backwards, and/or sideways, with respect to the vehicle, with the addition in one proposal of swivel means which are fitted to the seat in order to enable the seat to be rotated into a position which enables the person either to leave or to sit on the seat more easily.

The previously proposed systems still present disabled persons with difficulties. For example, movement between a vehicle seat and a wheelchair by a disabled person alone is virtually impossible and requires a considerable degree of help from and substantial effort by another person.

In an embodiment of the invention to be described below, a vehicle seat may be moved from within the confines of the interior of a vehicle along a curved path to a position substantially outside and either towards the front or the rear of a vehicle door opening. In this position outside the vehicle the seat faces either backwards or forwards according to the arrangement of the curved path, and an invalid may move with comparative ease from a wheelchair on to the seat whereupon the whole seat assembly can be swung back into the vehicle. Similarly, movement from a vehicle seat in a position outside a vehicle to a wheelchair is comparatively easy.

Embodiments of the invention will now be described, by way of example, with reference to the accompanying diagrammatic drawings, in which:

FIG. 1 is a partially exploded view of a mechanism for use with a seat assembly.

Figure 2:
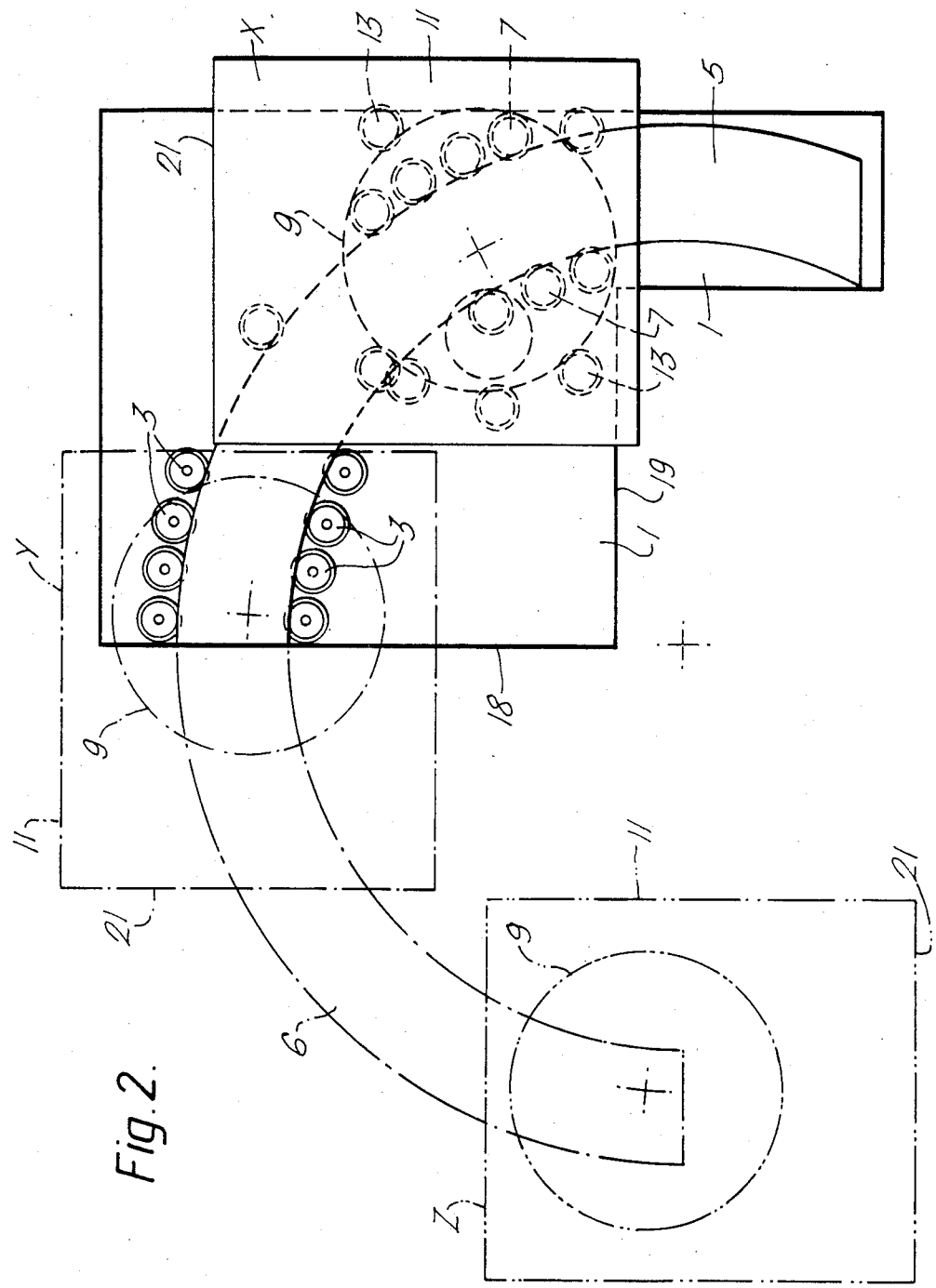
Figure 5:
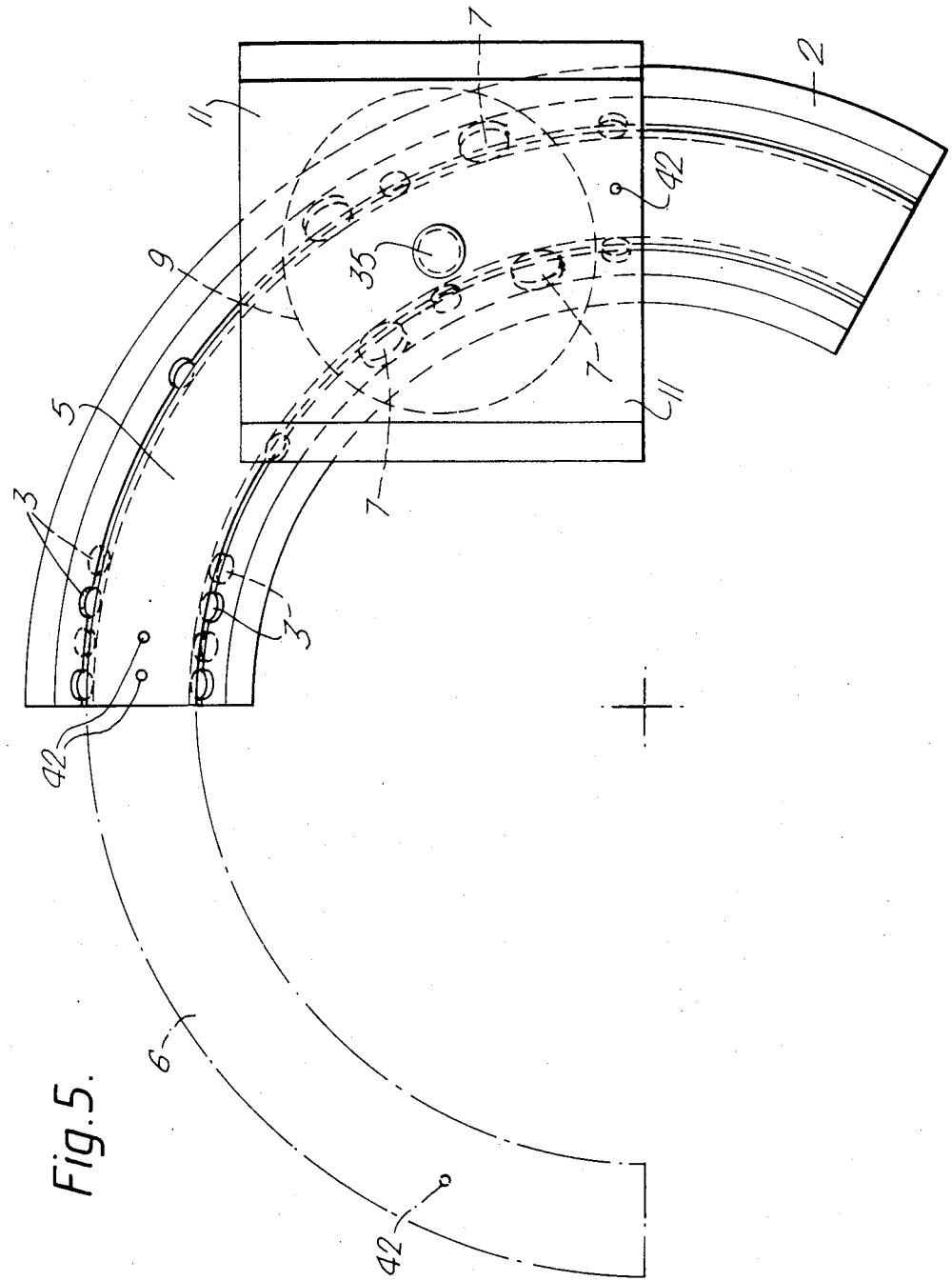
Figure 6:
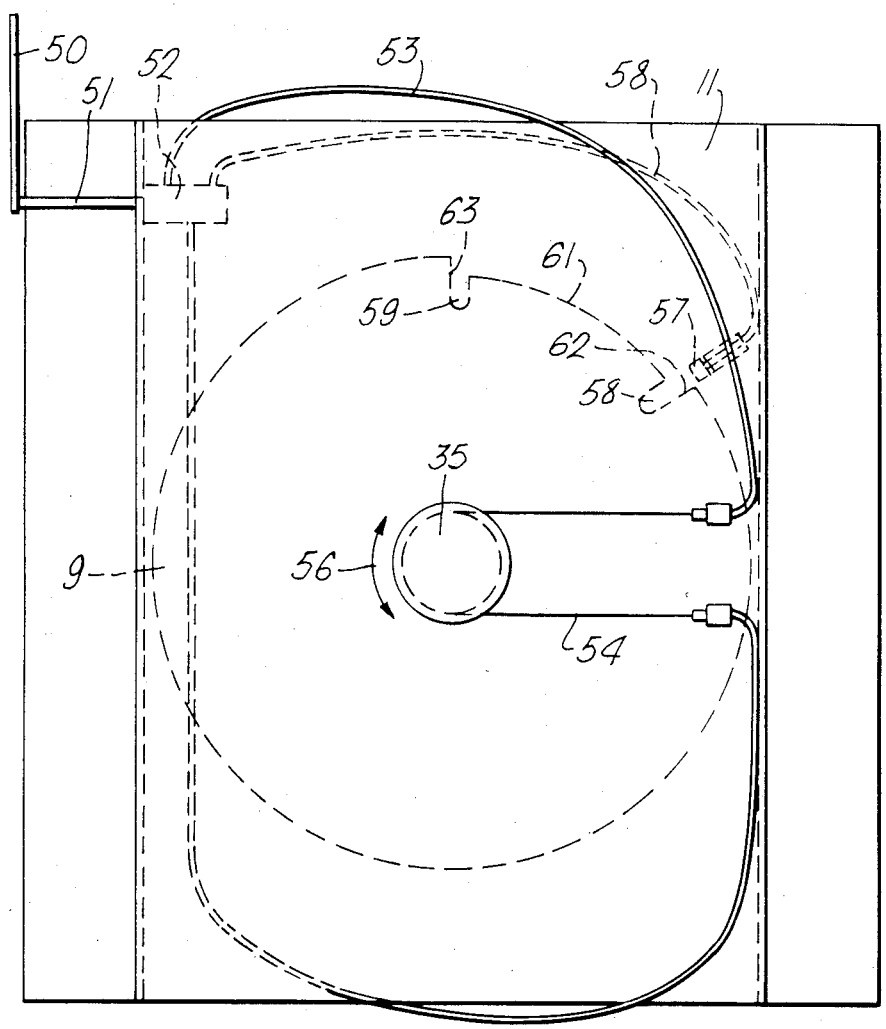

FIG. 2 is a diagrammatic plan view of the mechanism shown in FIG. 1, illustrating stages in its operation, FIG. 3 is a diagrammatic cross-sectional view through a further beam mounting arrangement, FIG. 4 is a diagrammatic end view of a part of the support for a seat, FIG. 5 is a diagrammatic plan view of the arrangement shown in FIG. 3, and, FIG. 6 is a diagrammatic plan view of an angular adjusting arrangement.

Referring to FIGS. 1 and 2, there is shown a supporting floor pan 1, which supports the mechanism and is bolted to the floor of a vehicle. Upon the pan 1, there is mounted a cured base plate 2, which carries support wheels 3, which are pivoted for rotation about shafts 4. The support wheels 3 extend into grooves in the respective opposite sides of a curbed beam 5. The beam 5 is able to move with respect to the base 2 between the wheels 3 into a position indicted by dash-dot lines 6.

The curved beam 5 has second grooves in its opposite edges in which there run support wheels 7 which rotate about shafts 8 extending from a carriage 9, thereby enabling the carriage 9 to run along the beam 5.

A seat mounting plate 11 indicated by dash-dot lines carries shafts 12 which extend from the underside of the plate 11 and which carry seat mounting plate support wheels 13 which run in a groove in the edge of the carriage 9. the seat mounting plate 11 is thus rotatable via the wheels 13 about the carriage 9. A drive wheel 14 which is mounted on the seat mounting plate 11 engages a flange (not shown) on the carriage 9 for rotating the seat mounting plate 11 about the carriage assembly by means (not shown).

A seat indicated at 16 by broken lines, is mounted on the seat mounting plate 11, by means not shown.

Means for locking the beam 5 to the supporting floor pan 1 is indicated diagrammatically at 17 as a bolt which may be operated, by means not shown, to extend upwards from beneath the pan 1 through one of a number of holes in the beam 5 in order to lock the beam 5 in one of a number of desired positions, between that in which it is shown and the dash-dot position 6.

The pan 1 is arranged with its edge 18 adjacent the door of a vehicle and its edge 19 towards the rear of the vehicle.

Considering the arrangement shown in FIG. 2, in particular, the pan 1, which is fixed to the floor of a vehicle, carries the beam 5 via support wheels 3 which run in a first pair of edge grooves in the beam 5. The movable carriage 9 is carried above the beam 5 by support wheels 7 which run in a second pair of edge grooves in the beam 5. The seat mounting plate 11 is carried above the movable carriage 9 by support wheels 13 which are rotatable about shafts 12 depending from the seat mounting plate 11 and which run in a groove in the edge of the movable carriage 9.

The seat mounting plate 11, which carries the seat 16, may thus rotate about the movable carriage 9. The seat mounting plate 11 has an edge 21 which faces towards the front of the vehicle.

In use, consider the assembly to be locked in the solid line position with the seat mounting plate 11 in the position X and a seat in the normal position of a vehicle.

In order to enable a person in the seat to be moved out of the vehicle, the movable carriage 9 is first released from the locked position on beam 5 and the carriage 9, with the mounting plate 11 and seat 16, are moved by means of the wheels 7 along the beam 5 until the mounting plate 11 is in the position shown at Y and the seat 16 extends through the doorway of the vehicle over the edge 18 of the pan 1. Means, not shown, is provided to retain the carriage 9 upon the beam 5.

It may be that, during this movement, relative rotation between the seat mounting plate 11 and the carriage 9 is necessary and such movement may be accomplished by rotating the seat 16 and the plate 11 via the wheels 13 which run in an edge groove in the carriage 9. This addition rotation of the seat and mounting plate 11 may be achieved by means of the drive wheel 14 which may be driven manually via a lever arrangement.

In order to move the seat 16 completely out of the vehicle, from the position indicated for the mounting plate 11 at Y to the position indicated at Z, the assembly including the carriage 9 and the plate 11 is first locked to the beam 5 in the position shown at Y and the bolt 17 locking the beam 5 to the pan 1 is released, thereby enabling the beam 5 to be moved to the position 6 thereby carrying the assembly 9 and 11 with the seat 16 to the position shown at Z for the plate 11. The beam 5 runs on the support wheels 3 during this movement. The seat 16 is now completely out of the vehicle with the edge 21 of the plate 11 and thus the seat facing in the opposite direction to that in which it faced when it was in the vehicle. Of course, in order to return the seat to the vehicle, the operations are carried out in reverse. The beam 5 is moved from the position 6 to the original solid lined position on the pan 1, the beam 5 is locked in position by the bolt 17, the carriage 9 is released from its locked position on the beam 5 and the assembly 9, 11, 16 is moved to the position in the vehicle, with the plate 11 as indicated at X, and locked in position on the beam 5. Shaft 37 is arranged at the centre of the carriage 9. Rotation of the pulley wheel 35 causes a pin 38, which extends transversely of the shaft 37 into a slot 39 in the housing 36, to slide in the slot 39 and thereby producing relative longitudinal movement of the shaft 37 with respect to the housing 36. This movement causes the end 41 of the shaft 37 either to enter or to be moved out of a hole 42 in the beam 5, and to lock or to release the assembly of the carriage 9, the seat mounting plate 11 and a seat to or from the beam 5.

In FIG. 4, an arrangement similar to that in FIG. 3 is shown with the base of a seat indicated at 43 and adjustable supports 43A for the seat shown arranged on the mounting plate 11.

FIG. 5 shows, in plan view, the arrangement illustrated in FIG. 3, with the same reference numerals employed to indicate parts which are similar to those previously referred to. It will be noted that a number of holes 42 are provided for locating the assembly 9, 11 and 16 at different positions on the beam 5.

FIG. 6 shows a lever 50 coupled by a shaft 51 to a control unit 52 for a Bowden cable 53. The inner wire 54 of the Bowden cable passes around the pulley wheel 35 whereby movement of the lever 50 to cause rotation of the shaft 51 in a clockwise or anti-clockwise direction causes a respective corresponding movement of the pulley wheel 35, as indicated by the arrow 56. As has been explained above this movement controls the movement of the shaft 37 with respect to the housing 36.

A bolt 57 coupled to a Bowden cable 58 under the control of the lever 50 cooperates with the carriage 9 in order either to lock the carriage 9 in a particular rotational position with respect to the beam 5 or to allow free rotational movement of the carriage 9 between two positions. Thus, in a first position of the lever 50, the bolt 57 is caused to enter either a notch 58 or a notch 59 in the edge of the carriage 9, thereby to lock the carriage in a particular position. In a second position of the lever 50, the bolt 57 extends to a position within the outer circumference of the carriage 9, but not so far as to reach the recessed edge 61 of the carriage 9. Thus in this position the carriage 9 is allowed to rotate between the ends 62 and 63 of the recessed portion.

It will be understood that, although the invention has been described with reference to particular embodiments, by way of example, they are not to be considered as limitations upon the scope of the invention and that variations, modifications and combinations may be made within the scope of the invention.

For example, although in the embodiments described the support wheels 3 extend along only a part of the length of the base 2, support wheels 3 may be arranged throughout the length of the curved base 2, as indicated diagrammatically in FIG. 5. Furthermore, the wheels 3 may be arranged with different spacings over one portion of base than over another.

It will also be appreciated that the seat 16 may be removed from beam 5 and employed in a separate wheelchair frame, instead of transferring a person from a seat 16 to a wheelchair.

It will also be understood that the beam 5 may be arranged so that the seat 16 faces towards the rear of the vehicle when in a vehicle and forwardly when out of the vehicle.

The seat 16 may be replaced with a detachable wheelchair seat, or other seating means. The seat 16 may swivel freely without being driven by wheel means 14. The carriage 9 may contain the seat rotating means 14 and other rotating means may be used. The beam 5 may move along its length supported by supporting means other than the rotating wheels 3. The carriage 9 may move along the beam 5 supported by supporting means other than the rotating wheels 7. The floor pan 1 may be of a different construction. A straight beam or beams pivoted along a curved path may be used instead of the curved beam 5. A forward and sideways movement assembly guided along a curved path may be used, instead of the curved beam 5. The origin of the path of the curve may be located inside or outside of the confines of a vehicle.

We claim:

1. A movable seat arrangement including a base plate arranged to be fixed to the floor of a vehicle, the base plate defining a curved path, a beam, means to locate and guide the beam in such a way that it may be moved along the curved path defined by the base plate, a seat mounting plate, the seat mounting plate being arranged to carry a seat on one face thereof, and means coupling the seat mounting plate to the beam whereby the seat mounting plate is carried upon the beam for movement either with the beam, or along the length of the beam.

2. A movable seat arrangement as claimed in claim 1 wherein said means for coupling include a carriage coupling the seat mounting plate to the beam, the seat mounting plate being rotatably mounted relative to the carriage.

3. A movable seat arrangement as claimed in claim 1 or claim 2 including first support wheels along the curved path, first grooves along the opposite edges of the beam, the first support wheels engaging in the first grooves to support and guide the beam in its movement along the curved path, second support wheels supporting the seat mounting plate, and second grooves along the opposite edges of the beam, the second support wheels engaging in the second grooves to enable the seat mounting plate to be moved along the length of the beam.

4. A movable seat arrangement as claimed in claim 3 including means for locking the beam in a particular position after movement along the curved path relative to the base plate, and said means for coupling including means for lockingly positioning the seat mounting plate along the length of the beam.

5. A movable seat arrangement as claimed in claim 2 including means for locking the carriage in a particular position with respect to the beam.

* * * * *